United States Patent
Martin et al.

(10) Patent No.: US 10,745,530 B2
(45) Date of Patent: Aug. 18, 2020

(54) SIZING COMPOSITION FOR REINFORCING FIBRES AND APPLICATIONS THEREOF

(71) Applicants: Airbus Safran Launchers SAS, Paris (FR); Universite de Reims Champagne-Ardenne, Reims (FR); Centre National de la Recherche Scientifique, Paris (FR)

(72) Inventors: Arnaud Martin, Haucourt-Moulaine (FR); Brigitte Defoort, Saint Medard en Jalles (FR); Xavier Coqueret, Reims (FR)

(73) Assignees: AIRBUS SAFRAN LAUNCHERS SAS, Paris (FR); UNIVERSITE DE REIMS CHAMPAGNE-ARDENNE, Reims (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 676 days.

(21) Appl. No.: 15/117,756

(22) PCT Filed: Feb. 11, 2015

(86) PCT No.: PCT/EP2015/052817
§ 371 (c)(1),
(2) Date: Aug. 10, 2016

(87) PCT Pub. No.: WO2015/121274
PCT Pub. Date: Aug. 20, 2015

(65) Prior Publication Data
US 2016/0355645 A1    Dec. 8, 2016

(30) Foreign Application Priority Data
Feb. 12, 2014 (FR) ................... 14 51099

(51) Int. Cl.
*B05D 3/00* (2006.01)
*C08J 5/06* (2006.01)
(Continued)

(52) U.S. Cl.
CPC .............. *C08J 5/06* (2013.01); *C08G 59/027* (2013.01); *C08G 59/66* (2013.01); *C08G 59/686* (2013.01);
(Continued)

(58) Field of Classification Search
CPC . C08J 5/06; C08J 5/042; C08J 2335/02; C08J 2363/08; C08J 2363/02;
(Continued)

(56) References Cited

U.S. PATENT DOCUMENTS 5,214,098 A    5/1993   Setiabudi et al.
8,282,764 B2   10/2012  Defoort et al.
(Continued)

FOREIGN PATENT DOCUMENTS

EP    0138609 A2    4/1985
EP    0640702 A1    3/1995
(Continued)

OTHER PUBLICATIONS

English translation of JP-56043335-A. (Year: 2019).*
Merriam-Webster, prepreg, 1828 (Year: 2019).*

*Primary Examiner* — Hai Y Zhang
(74) *Attorney, Agent, or Firm* — Pearne & Gordon LLP

(57) ABSTRACT

A sizing composition for reinforcing fibres is provided which makes it possible to improve the adhesion of these fibres with respect to an organic matrix that forms, with them, a part made of a composite material and that results from the chain transfer polymerization of a curable resin. The sizing composition includes a polybutadiene prepolymer comprising at least two epoxide functions, a cross- (Continued)

linking agent comprising at least two reactive functions, at least one of which is a thiol function; and a catalyst comprising at least one tertiary amine function. The sizing composition may be used in the following fields of use: aeronautical, aerospace, railway, naval and motor vehicle industries, for example, for the production of structural, engine, passenger compartment or body work parts; arms industry, for example, for the production of parts incorporated into the composition of missiles or missile launch tubes; sports and leisure goods industry, for example, for the production of goods intended for water sports and board sports.

21 Claims, 3 Drawing Sheets

(51) Int. Cl.

| | | |
|---|---|---|
| *C08G 59/66* | (2006.01) | |
| *C08G 59/68* | (2006.01) | |
| *D06M 15/227* | (2006.01) | |
| *D01F 11/14* | (2006.01) | |
| *C08L 63/08* | (2006.01) | |
| *C08L 15/00* | (2006.01) | |
| *C08J 5/04* | (2006.01) | |
| *D06M 13/224* | (2006.01) | |
| *D06M 13/252* | (2006.01) | |
| *C08G 59/02* | (2006.01) | |
| *C08J 5/24* | (2006.01) | |
| *D06M 23/10* | (2006.01) | |
| *D06M 101/40* | (2006.01) | |

(52) U.S. Cl.
CPC .................. *C08J 5/042* (2013.01); *C08J 5/24* (2013.01); *C08L 15/00* (2013.01); *C08L 63/08* (2013.01); *D01F 11/14* (2013.01); *D06M 13/2246* (2013.01); *D06M 13/252* (2013.01); *D06M 15/227* (2013.01); *C08J 2333/14* (2013.01); *C08J 2335/02* (2013.01); *C08J 2363/02* (2013.01); *C08J 2363/08* (2013.01); *D06M 23/10* (2013.01); *D06M 2101/40* (2013.01); *D06M 2200/40* (2013.01); *D10B 2505/02* (2013.01)

(58) Field of Classification Search
CPC .... C08J 2333/14; C08G 59/027; C08G 59/66; C08G 59/686; C08L 63/08; C08L 15/00; D01F 11/14; D06M 15/227; D10B 2505/02
USPC ........................... 427/207.1, 275.5, 301, 302
See application file for complete search history.

(56) References Cited

U.S. PATENT DOCUMENTS

| | | | |
|---|---|---|---|
| 8,328,977 B2 | 12/2012 | Defoort et al. | |
| 8,399,064 B2 | 3/2013 | Schultz et al. | |
| 8,618,186 B2 | 12/2013 | Krzeminski et al. | |
| 9,051,408 B2 | 6/2015 | Coqueret et al. | |
| 2008/0255332 A1* | 10/2008 | Defoort et al. ......... | C08F 24/00 526/273 |
| 2014/0154939 A1* | 6/2014 | Rong et al. .......... | H05K 1/0373 442/59 |

FOREIGN PATENT DOCUMENTS

| | | | | |
|---|---|---|---|---|
| EP | 1484435 | A2 | 12/2004 | |
| EP | 1924727 | B1 | 5/2008 | |
| EP | 2099849 | B1 | 9/2009 | |
| JP | 56043335 | A * | 4/1981 | |
| JP | 03076869 | A | 4/1991 | |
| JP | 2002327374 | A | 11/2002 | |
| WO | 2007031576 | A1 | 3/2007 | |
| WO | 2008071652 | A1 | 6/2008 | |
| WO | 2010023217 | A1 | 3/2010 | |
| WO | 2011010457 | A1 | 1/2011 | |
| WO | 2013056426 | A1 | 4/2013 | |
| WO | WO-2013056426 | A1 * | 4/2013 | ............. C08G 59/34 |

* cited by examiner

SIZING COMPOSITION FOR REINFORCING FIBRES AND APPLICATIONS THEREOF

CROSS-REFERENCE TO RELATED APPLICATIONS

This application is a U.S. national phase under the provisions of 35 U.S.C. § 371 of International Patent Application No. PCT/EP15/52817 filed Feb. 11, 2015, which in turn claims priority of French Patent Application No. 1451099 filed Feb. 12, 2014. The disclosures of such international patent application and French priority patent application are hereby incorporated herein by reference in their respective entireties, for all purposes.

TECHNICAL FIELD

The instant invention relates to the field of sizing of reinforcing fibres (or reinforcement fibres) suitable for use in manufacturing of composite materials made of an organic matrix and reinforcing fibres.

More specifically, it relates to a sizing composition for reinforcing fibres which can improve the adhesion between these fibres and an organic matrix forming with them a part made of a composite material and resulting from the chain transfer polymerization of a curable resin.

It also relates to applications of this composition and particularly to a method of improving the adhesion between reinforcing fibres and an organic matrix forming with these fibres a part made of a composite material and resulting from the chain transfer polymerization of a curable resin, and that includes a sizing of the reinforcing fibres by said composition.

The invention, which allows obtaining parts made of composite materials with remarkable load resistance properties, both for transverse loads (in other words along the direction perpendicular to the reinforcing fibres) and for longitudinal loads (in other words along the direction of the reinforcing fibres), is particularly advantageous in the aeronautical, aerospace, railway, naval and automobile industries, for making structural parts, engine parts, passenger compartment and body work parts.

However, it can also be used in other types of industries such as the arms industry, for example for the production of parts incorporated in the composition of missiles or missile launch tubes, or sports or leisure goods, for example for manufacturing goods for use in water and sliding sports.

STATE OF PRIOR ART

Composite materials are heterogeneous materials that make use of the exceptional mechanical properties of materials that cannot be made in solid form but only in the form of fibres, by embedding them in a matrix composed of a cured organic polymer (or resin) that bonds the fibres to each other, distributes stresses in the composite materials and protects fibres against chemical attacks.

One necessary condition for obtaining a high performance composite material is that the bond between the reinforcing fibres and the constituent matrix is good. If the reinforcing fibres/matrix bond is not strong enough, the composite material obtained has mediocre transverse mechanical properties (such as the shear strength) and therefore very limited applications since parts made of composite materials are often required to work in a state of 3-dimensional stress.

Fibres that have been frequently used as reinforcing materials such as carbon fibres have low natural adhesion with respect to polymer matrices.

Thus reinforcing fibre manufacturers have attempted to adapt their fibres to resins that can be used as matrices by manufacturers of parts made of composite materials.

This adaptation has been made in two different ways:
firstly, by surface treatments that are always aimed at creating functional groups on the surface of fibres capable of reacting with chemical functions carried by the resins; these are mainly chemical or electrolytic oxidation treatments (for example, see JP-A-3-076869 [1]) but other treatment types have also been proposed such as plasma heat treatments (for example see EP-A-1 484 435 [2]), electrolysis in an acid or basic medium (see EP-A-0 640 702 [3]) or the implantation of Si or B type atoms (see JP-B-2002-327374 [4]); and
secondly, by the use of special sizing agents, in other words by the deposition, on the surface of the fibres, of products designed to make the fibres more compatible with the resins, to facilitate their impregnation by the resins and to achieve a "bond" between the fibres and the matrices formed by the polymerization of these resins; in general, the sizing agents used are polymers or copolymers with complex chemical structures that are chosen principally by previous experience.

Note that sizing agents are also applied to reinforcing fibres for purposes other than to improve their bond with an organic matrix, for example to facilitate handling, to lubricate them and protect them from abrasion that can occur due to friction between the fibres.

Although the treatments mentioned above are generally relatively efficient for matrices obtained by thermal polymerization of resins (that is to say, polymerization induced by heat), it has been found that they are not efficient or are insufficiently efficient when the matrices are made with resins for which polymerization is induced by light radiation (visible or ultraviolet light) or by ionising radiation (electron beam or X-rays).

Indeed, experience shows that transverse mechanical performances of composite materials made with polymerized resins for which polymerization is induced by light radiation or by ionising radiation are significantly lower than those of the best composite materials made with resins polymerized by the thermal routed, which is classically interpreted as the fact that the bond between the reinforcing fibres and the matrix is insufficient despite treatments applied by reinforcing fibres manufacturers to their fibres.

However, there are a number of advantages in the polymerization of resins under light radiation or ionising radiation with respect to the polymerization of resins by the thermal route, these advantages being related particularly to the possibility of operating without autoclaves and therefore of more easily manufacturing composite components which are large in size or complex in structure, and of obtaining much higher polymerization rates to increase production rates while lowering costs.

It was recently disclosed by the Applicant how to improve the adhesion between carbon fibres and a matrix obtained by polymerization of a resin that can be polymerized by chain transfer (since in practice, resins that can be polymerized under light radiation or under ionising radiation are resins that are polymerized by a chain transfer mechanism) by grafting on the surface of fibres groups capable of acting as chain transfer agents during polymerization of the resin (see EP-A-1 924 727 [5]) or by depositing on the surface of fibres a polymer film containing groups capable of acting as chain transfer agents during polymerization of the resin (see EP-A-2 099 849 [6]).

Continuing his work on the improvement of the transverse mechanical properties of composite materials, the Applicant set the goal of attempting to find a new solution to the problem of the lack of adhesion between reinforcing fibres and, in particular, between carbon fibres and the organic matrix in which these fibres are embedded when this matrix is obtained by polymerization of a resin that can be polymerized under light radiation or ionising radiation, that is to say in practice by a chain transfer mechanism.

PRESENTATION OF THE INVENTION

The invention achieves this and other purposes firstly by using a sizing composition for reinforcing fibres that comprises:
- a polybutadiene prepolymer comprising at least two epoxy functions, more simply called an "epoxy polybutadiene prepolymer" in the following;
- a cross-linking agent comprising at least two reactive functions, at least one of which is a thiol function; and
- a catalyst comprising at least one tertiary amine function.

Thus, according to the invention, the following are combined in the same sizing composition:
- an epoxy polybutadiene prepolymer capable of forming, by polymerization and cross-linking, a homogeneous elastomer film over the entire surface of the reinforcing fibres;
- a cross-linking agent that performs two functions: firstly it cross-links the epoxy polybutadiene prepolymer on the surface of the fibres by reaction with the epoxy functions of this prepolymer, and secondly it sets up thiol functions—through the epoxy polybutadiene film—on the surface of the reinforcing fibres; and
- a tertiary amine catalyst, the role of which is to catalyse the reaction between the epoxy functions of the epoxy polybutadiene prepolymer and the reactive functions of the cross-linking agent so as to form a network from this prepolymer.

The elastomer film that is formed on the surface of the fibres after polymerization and cross-linking of the epoxy polybutadiene prepolymer allows, when the reinforcing fibres are subsequently brought into contact with a resin that can be cured by chain transfer polymerization:
- conferring a homogeneous surface condition on the fibres, since the surface of the elastomer film is substituted for the surface of these fibres;
- isolating the surface of the curable resin fibres thus preventing polymerization of this resin from being inhibited by the reactive functions present on the fibre surface as a result of their manufacturing method; and
- covering the fibres with thiol functions that will (1) sensitise the polymerization of the curable resin and (2) act as chain transfer agents during the polymerization of this resin and therefore prime the formation starting from the surface of the elastomer film of new resin polymer chains that will be covalently bonded to this surface as soon as they are created, by transformation into active centres, thus improving the quality of the bond between the fibres and the organic matrix resulting from the polymerization of the curable resin.

Moreover, the reactive functions carried by the epoxy polybutadiene prepolymer and the cross-linking agent can react with the reactive functions present on the surface of the fibres as a result of their fabrication process and thus form covalent bonds between the fibres and the elastomer film that will also contribute to improving the quality of the interface between the fibres and the organic matrix resulting from the polymerization of the curable resin.

The result is a very significant increase in the adhesion between the reinforcing fibres and the organic matrix resulting from the polymerization of the curable resin and therefore in the transverse mechanical properties of the composite materials formed by these fibres and this matrix.

According to the invention, the epoxy polybutadiene prepolymer preferably comprises at least two repetitive units chosen from the units of formulae (I) and (II) below:

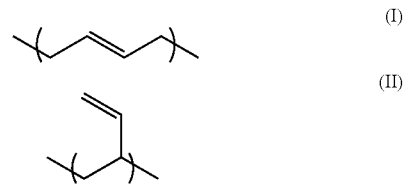

and at least two repetitive units of formula (III) below:

Examples of epoxy polybutadiene prepolymers of this type are prepolymers marketed by the Sartomer and Cray Valley companies under commercial references Poly Bd™ 600E and Poly Bd™ 605E.

These prepolymers schematically comply with formula (IV) below:

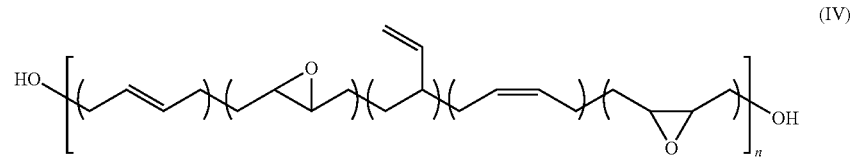

in which n is the number of units present between the square brackets, and typically have the following physicochemical characteristics:
- molecular weight ($M_n$) equal to about 1300;
- epoxy equivalent weight (EEW) equal to 400-500 g/mole for Poly Bd™ 600E and 260-330 g/mole for Poly Bd™ 605E; and
- viscosity at 30° C. equal to 7 Pa·s for Poly Bd™ 600E and 22 Pa·s for Poly Bd™ 605E.

As mentioned above, the cross-linking agent comprises at least two reactive functions, at least one of which is a thiol function.

According to the invention, this cross-linking agent may be chosen particularly from compounds including:

- a carboxylic acid function and a thiol function for example thioglycolic acid, thiolactic acid, 3-mercaptopropionic acid, 11-mercaptoundecanoic acid or 16-mercaptohexadecanoic acid;
- a non-aromatic amine function (that is to say a function not related to one or several aromatic functions cycles) and a thiol function, for example cysteamine;
- two carboxylic acid functions and a thiol function, for example thiomalic acid, mercaptosuccinic acid and dimercaptosuccinic acid;
- a carboxylic acid function, a non-aromatic amine function and a thiol function, for example cysteine;
- two thiol functions for example such as 1,2-ethanedithiol, 1,3-propanedithiol, 1,4-butanedithiol, 2,3-butanedithiol or 1,5-pentanedithiol; or
- three thiol functions, for example pentaerythritol tetrakis (3-mercaptopropionate), pentaerythritol tetrakis(2-mercaptoacetate), trimethylolpropane tris(3-mercaptopropionate) or tris[2-(3-mercaptopropionyloxy)ethyl] isocyanurate.

Preferably, the cross-linking agent is a tri-functional compound, that is to say with three reactive functions, in which case it is advantageously chosen from compounds that comprise two carboxylic acid functions and one thiol function, for example mercaptosuccinic acid, and compounds that carry three thiol functions, for example pentaerythritol tetrakis(3-mercaptopropionate).

The catalyst is advantageously chosen from 2-(dimethylamino)ethyl methacrylate, 2-(dimethylamino)ethyl acrylate, 2-(diethylamino)ethyl acrylate and 3-(dimethylamino)propyl acrylate.

According to the invention, the composition preferably comprises in percentages by mass of the total mass of the composition:

- from 45 to 96% and even better from 55 to 72% of epoxy polybutadiene prepolymer;
- from 2.5 to 55% and even better from 27 to 45% of cross-linking agent; and
- from 0.1 to 2.2% of catalyst.

For application to reinforcing fibres, the sizing composition according to the invention may be in the form of a solution.

In this case, it also comprises an organic solvent such as methylethylketone, tetrahydrofurane, ethyl and methyl ether, ethyl acetate or a mixture thereof.

In this case also, the epoxy polybutadiene prepolymer, the cross-linking agent and the catalyst together represent between 0.5 and 5%, and even better between 1 and 3% in percentages by mass of the total mass of the composition, while the organic solvent represents between 95 and 99.5% and even better between 97 and 99% in percentages by mass of the total mass of the composition.

As a variant, the sizing composition may also be in the form of an emulsion with an organic internal (or dispersed) phase and an aqueous external (or dispersing) phase so as to limit the use of organic solvents and thus to provide an optimum protection for the safety of persons likely to prepare or use this sizing composition and for the environment.

In this case:

- either the cross-linking agent is a compound that is soluble in organic solvents—as it is the case for example for compounds with three thiol functions such as pentaerythritol tetrakis(3-mercaptopropionate), in which case the organic internal phase preferably comprises an organic solvent immiscible with water containing the epoxy polybutadiene prepolymer, the cross-linking agent and the catalyst, while the aqueous external phase preferably consists of water containing a surfactant;
- or the cross-linking agent is a compound that is insoluble or only slightly soluble in organic solvents—as is the case for example for compounds with two carboxylic acid functions and one thiol function such as mercaptosuccinic acid, in which case the organic internal phase preferably comprises an organic solvent immiscible with water containing the epoxy polybutadiene prepolymer, while the aqueous external phase preferably comprises water containing the cross-linking agent, the catalyst and a surfactant.

Preferably, the organic solvent present in the emulsion is ethyl acetate.

Also preferably, the surfactant is a non-ionic surfactant such as poly(ethylene glycol) diacrylate, or an anionic surfactant such as sodium dodecylsulphate (or sodium laurylsulphate) or ammonium laurylsulphate.

Also preferably, the mass of the organic internal phase is between 1 and 6% and even better between 1 and 3% of the mass of the aqueous external phase.

Such an emulsion can notably be obtained by adding a solution that comprises the epoxy polybutadiene prepolymer, the cross-linking agent and the catalyst, or only the epoxy polybutadiene prepolymer, depending on the case, in the organic solvent immiscible in water, to an aqueous solution that contains only the surfactant, or the cross-linking agent and the catalyst and the surfactant, depending on the case, in water, and by a vigorously stirring, for example mechanical or by ultrasound.

The emulsion thus obtained is stable and comprises droplets formed either by the epoxy polybutadiene prepolymer, the cross-linking agent and the catalyst in the case in which the cross-linking agent and the catalyst are present in the organic internal phase, or only by the epoxy polybutadiene prepolymer in the case in which the cross-linking agent and the catalyst are present in the aqueous external phase, most of the droplets typically having a mean diameter (or equivalent diameter) varying between 50 nm and 200 nm.

Regardless of the form in which the sizing composition is presented (solution or emulsion), sizing of the reinforcing fibres by this composition is extremely easy to implement.

All that is necessary is to soak the fibres, for example using an inking roller, in a bath containing the sizing composition according to the invention for as long as necessary to obtain the deposition of a layer on the surface of the fibres corresponding typically to 0.5 to 1.5% by mass of the mass of the fibres, then applying a heat treatment to the fibres, after they have been removed from the sizing bath, at a temperature varying for example from 60 to 180° C. for a duration of between 0.3 and 3 hours depending on the type of epoxy polybutadiene prepolymer used, to obtain the formation of a homogeneous elastomer film on the surface of fibres by polymerization/cross-linking of this prepolymer.

Another purpose of the invention is a method of sizing reinforcing fibres, characterized in that it comprises applying at least one layer of a sizing composition as described above on a surface of the fibres and then heat treating the layer thus applied.

In this method, the application of at least one layer of the sizing composition and the heat treatment applied to this layer can be done in particular as described above.

Another purpose of the invention is reinforcing fibres which comprise a sizing and which are characterized in that the sizing is formed by applying at least one layer of a sizing composition as described above on the surface of the fibres and then heat treating the layer thus applied.

The reinforcing fibres thus sized can be used immediately in the fabrication of parts made of composite materials, or they may be stored ready for subsequent use, or they may be packaged, for example in the form of prepreg mats ready for delivery to manufacturers of parts made of composite materials. The invention can be used equally well by manufacturers of reinforcing fibres and by their users.

According to one preferred application of the invention, the reinforcing fibres are carbon fibres.

However, they may also be glass fibres, quartz fibres, graphite fibres, metallic fibres, poly(p-phenylene benzobisoxazole) fibres, aramid fibres, polyethylene fibres, boron fibres, silicon carbide fibres, natural fibres (for example linen, hemp or bamboo fibres) and mixtures of different kinds of fibres, for example carbon/glass, carbon/aramid, etc.

Moreover, reinforcing fibres may be in different forms such as cut threads, ground fibres, mats with continuous filaments, mats with cut filaments, roving, fabric, knits, felts, etc. or in complex forms made by the combination of different types of plane materials.

Another purpose of the invention is a method of improving the adhesion of reinforcing fibres with respect to an organic matrix forming with the fibres a part made of a composite material, the part being obtained by bringing the fibres into contact with a resin that can be cured by chain transfer polymerization, then by polymerizing the resin, which method is characterized in that it comprises, before the fibres are brought into contact with the resin, a sizing of the fibres by applying at least one layer of a sizing composition as described above on a surface of the fibres and then by heat treating the layer thus applied.

Another purpose of the invention is a method of manufacturing a part made of a composite material comprising reinforcing fibres in an organic matrix, which method comprises bringing the reinforcing fibres into contact with a resin that can be cured by chain transfer polymerization and polymerizing the resin, and is characterized in that it further comprises, before the fibres are brought into contact with the resin, a sizing of the fibres by applying at least one layer of a sizing composition as described above on a surface of the fibres and then by heat treating the layer thus applied.

In the above methods, the reinforcing fibres are also preferably carbon fibres.

The curable resin can be chosen from the various resins that can be cured by a chain transfer polymerization mechanism, either under the effect of heat or light radiation or ionising radiation.

However, for the reasons mentioned above, the curable resin is preferably chosen from resins that can be cured under light radiation or ionising radiation, and particularly from among polyesters, epoxies (such as epoxies of the diglycidyl ether of bisphenol A or DGEBA type), epoxy (meth)acrylates (also called vinylesters or epoxyvinylesters, such as di(meth)acrylates of DGEBA), (meth)acrylates with a urethane core, bismaleimides, elastomers, silicons, epoxy (meth)acrylates being preferred particularly in the case in which the part made of the composite material will be used for space or aeronautical applications.

Obviously, the part made of a composite material can be made using any technique known to an expert in the subject of composite materials, such as filament winding moulding, simultaneous spray moulding, vacuum moulding, Resin Transfer Moulding (RTM), low pressure wet cold press moulding, moulding by pressing "Sheet Moulding Compounds" (SMC) or pultrusion moulding.

Apart from the advantages mentioned above, the invention has other advantages related to the very many different types of reinforcing fibres used for the manufacture of composite materials (long, medium long fibres, short fibres, oxidised fibres, fibres already sized by their suppliers, etc.), that they only use off-the-shelf products and can be used at costs compatible with operation at an industrial scale.

Other characteristics and advantages of the invention will become clearer after reading the remaining part of the description given below with reference to the appended drawings.

Obviously, this additional description is only given to illustrate the invention and in no way forms a limitation of it.

BRIEF DESCRIPTION OF THE FIGURES

FIG. 1A demonstrates the sensitising effect of an additive with a thiol function, dodecanethiol-1 (-♦-), while FIG. 1B demonstrates the inhibiting effect of two additives with a hydroxyl function, phenol (-♦-) and 9-phenanthrol (-▲-), and an additive with amine function, 1-aminopyrene (-■-); the dashed line on each of these figures corresponds to the conversion of the acrylate monomer to a polymer in the absence of an additive.

FIGS. 2A and 2B show adhesion test results obtained for two substrates consisting of carbon sheets treated by sizing compositions according to the invention, while FIG. 2C corresponds to the adhesion test result obtained for a substrate also consisting of a carbon sheet, but untreated.

DETAILED PRESENTATION OF PARTICULAR EMBODIMENTS

Example 1

Demonstration of the Sensitising Effect of a Thiol Functional Additive on Radical Polymerization of an Acrylate Monomer Under Ionising Radiation The sensitising effect of a thiol functional additive on radical polymerization of an acrylate monomer initiated by ionising radiation is demonstrated by tests consisting of:

mixing n-butyl acrylate (ABu) with dodecanethiol-1 with contents of 0.5, 1, 2, 5 and 10% by mass as a percentage of the total mass of the mixtures;

applying ionising radiation to the resulting mixtures (ionisation under ion beam) to a dose of 50 kGy in a single pass; and for each mix to which this ionising radiation is applied, determining the conversion ratio of n-butyl acrylate to poly(n-butyl acrylate) by size-exclusion chromatography (SEC).

SEC is done using a PL-GPC 50 Plus system associated with a PL-ASRT automatic injector (Polymer Laboratories, Varian Incorporated). The detector used is a reflective index (RI) detector. The SEC system is composed of three columns (PLgel 5 µm Mixed-C, 300×7.5 mm) in series. It also includes a pre-column (PLgel 5 µm Guard, 50×7.5 mm), which increases the total column length to 950 mm for an analysis time of 38 minutes. Tetrahydrofurane is used as solvent with a flow of 1 mL/min, the injection volume is 100 µL and the furnace temperature is 35° C. The samples are made in 4 mL pill boxes and are diluted to obtain a concentration of about 1 mg/mL. The solutions thus obtained are filtered on Millipore™ filters (pore diameter: 0.20 µm).

The conversion ratio, denoted $\pi$, from n-butyl acrylate to poly(n-butyl acrylate) is determined by calibrating the chromatography with solutions containing known masses of poly(n-butyl acrylate) and of n-butyl acrylate.

For a sample, it is the ratio of the mass of poly(n-butyl acrylate), denoted $m_{pABu}$, present in this sample to the total mass of poly(n-butyl acrylate) and n-butyl acrylate, denoted $m_{Abu}$, present in the same sample:

$$\pi = \frac{m_{pABu}}{m_{pABu} + m_{ABu}}$$

Figure 1A:
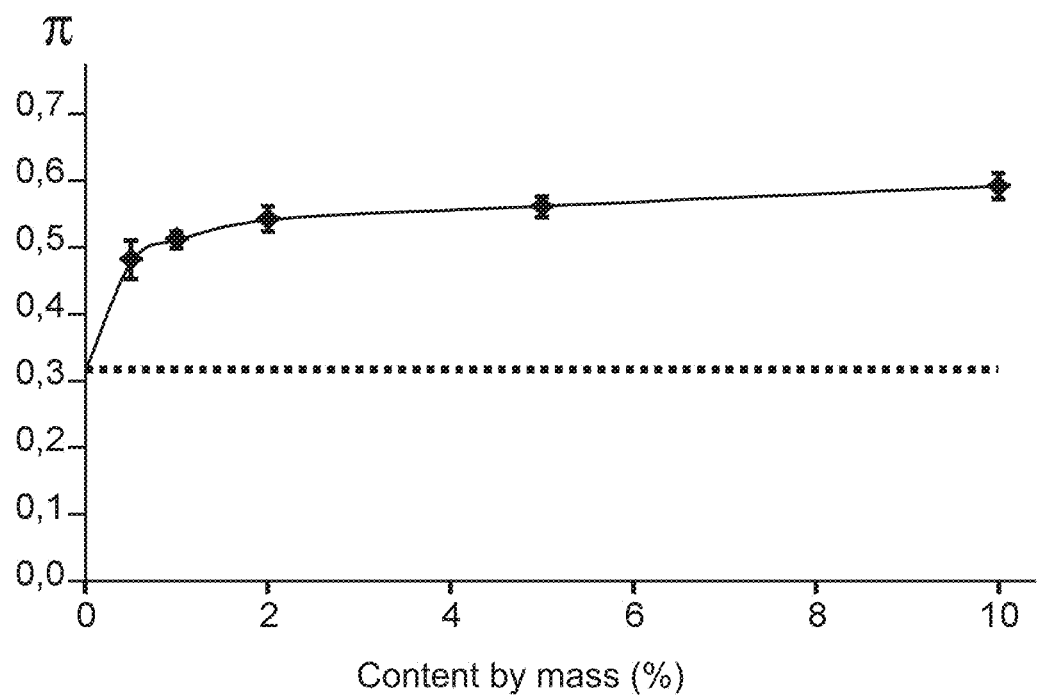
FIGS. 1A and 1B illustrate the effects of different additives on The conversion of an acrylate monomer to a polymer by radical polymerization initiated by ionising radiation, as evaluated by size-exclusion chromatography.

The result of these tests are illustrated on FIG. 1A that shows the variation of the conversion rate $\pi$ as a function of the content by mass of dodecanethiol-1 (-♦-) and the value obtained without any additive (dashed line).

This figure shows that a sensitising effect of dodecanethiol-1 on radical polymerization of n-butyl acrylate is observed starting from the addition of a very small quantity of this thiol (0.5% by mass) and that the conversion of the monomer to polymer is twice as high as when there is no additive, for a mass content of dodecanethiol-1 equal to 10%.

Figure 1B:
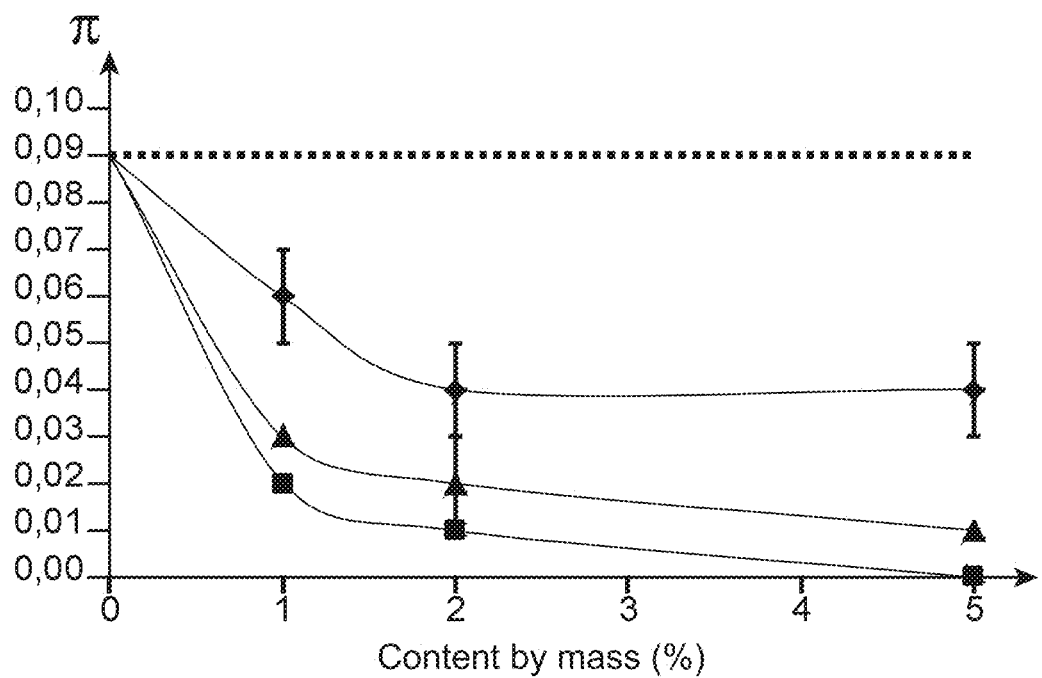

In comparison, FIG. 1B illustrates the results obtained during tests that were carried out like the previous tests except that the additives used were phenol (-♦-), 9-phenanthrol (-▲-) and 1-aminopyrene (-■-) with contents of 1, 2 and 5% by mass and then applying a dose of ionising radiation equal to 10 kGy to the n-butyl acrylate/additive mixtures. This figure also shows the variation in the conversion ratio of n-butyl acrylate into poly(n-butyl acrylate) as a function of the mass content of phenol (-♦-), 9-phenanthrol (-▲-) and 1-aminopyrene (-■-) as well as that obtained without any additive (dashed line).

This figure shows that hydroxyl functional additives such as phenol and 9-phenanthrol, or aromatic amine functional additives such as 1-aminopyrene, unlike a thiol functional additive such as dodecanethiol-1, have a strongly inhibiting effect on the conversion of n-butyl acrylate into poly(n-butyl acrylate) at mass contents as low as 1%, this inhibiting effect being particularly pronounced for 9-phenanthrol and 1-aminopyrene.

Example 2

Demonstration of the Beneficial Effects of a Sizing Composition According to the Invention on the Adhesion Between a Substrate and an Organic Matrix 2.1—at the Macroscopic Scale:

Two carbon sheets (made by the Goodfellow company, reference C 000440/13), hereinafter referred to as sheets 1 and 2, are treated with a sizing composition according to the invention that includes:

in the case of sheet 1: Poly Bd™ 605E prepolymer made by the Sartomer company as the epoxy polybutadiene prepolymer, mercaptosuccinic acid as the cross-linking agent, 2-(dimethylamino)ethyl methacrylate as the catalyst, in the following mass proportions: 71.7% of epoxy polybutadiene prepolymer, 26.9% of cross-linking agent and 1.4% of catalyst, the mixture being in solution with a content of 1 to 2% by mass in tetrahydrofurane; and in the case of sheet 2: the same constituents as those indicated above except for the cross-linking agent that is pentaerythritol tetrakis(3-mercapto-propionate) in the following mass proportions: 61.7% of epoxy polybutadiene prepolymer, 37.7% of cross-linking agent and 0.6% of catalyst, the mixture being in solution with a content of 1 to 2% by mass in tetrahydrofurane.

Sheets 1 and 2 are immersed in the sizing composition and then taken out of this composition and a heat treatment is carried out on them (100° C. for 1 hour) to induce polymerization/cross-linking of the epoxy polybutadiene prepolymer and thus the formation of an elastomer film on their surface.

A bisphenol A epoxy diacrylate monomer resin (UCB Chemicals, reference EB600) is then deposited on the upper part of sheets 1 and 2 and on the upper part of a third carbon sheet that will act as a reference sheet and that was not treated by a sizing composition according to the invention. In all cases, the resin is spread using a spiral applicator, into a 20 µm thick layer so as to cover the entire surface of the sheet. The resin is radical polymerized under an electron beam using a low energy electron accelerator (145 keV) of the Application Development Unit type (Advanced Electron Beams company). The total applied dose is 150 kGy.

Adhesion tests are carried out on each sheet 1, 2 and the reference sheet, according to ISO standard 2409.

Figure 2A:
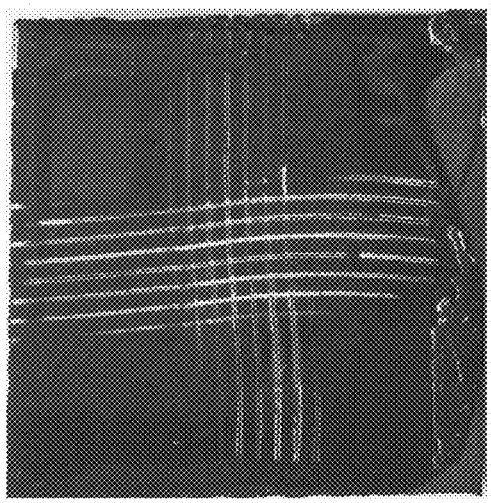
FIGS. 2A, 2B and 2C illustrate the beneficial effects of using a sizing composition according to the invention on the adhesion between a substrate and an organic matrix obtained by radical polymerization of an bisphenol A epoxy diacrylate monomer.
Figure 2B:
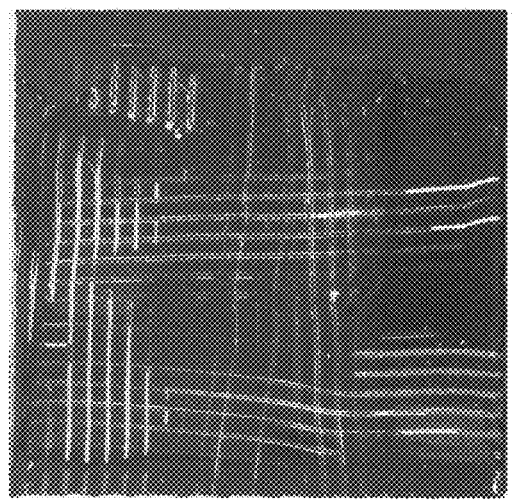
Figure 2C:
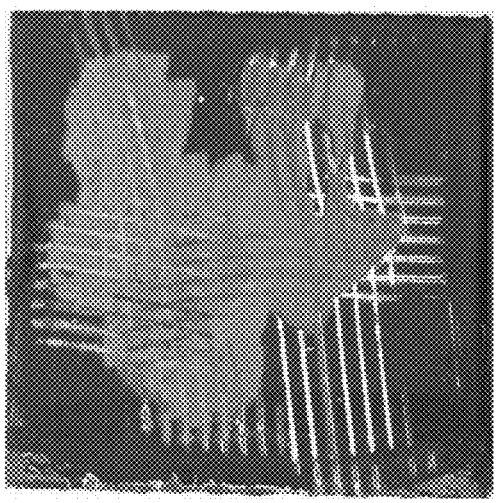

These tests that evaluate the adhesion level of a coating on a substrate are based on a "scratch test" method that consists of cutting this coating with a comb with 11 teeth separated from each other by 1 mm (Braive-Instrument company, reference 1540) so as to obtain a grid structure. The grid is obtained by applying a uniform pressure on the comb and making two incisions at 90°. Detachable parts that had not separated with the incision movements are removed using adhesive tape (Tesa™ 4120) applied by pressing on the grid surface with a finger and then quickly removed at an angle as close to 180° as possible. The adhesion level of the coating to the substrate is evaluated by comparison with images representative of the degree of degradation of the layering and referenced by ISO values. The results of the adhesion tests thus carried out are illustrated on FIGS. 2A, 2B and 2C, FIG. 2A corresponding to sheet 1, FIG. 2B corresponding to sheet 2 and FIG. 2C corresponding to the reference sheet.

As shown on the figures, the sheets treated with a sizing composition according to the invention (FIGS. 2A and 2B) have strong adhesion to the cured resin (with a measured ISO classification equal to 0), regardless of which thiol functional cross-linking agent is used, unlike the reference sheet (FIG. 2C) for which separation of the resin is observed and an ISO classification of 5 is obtained.

2.2—on Composite Materials:

Two composites families are prepared, hereinafter referred to as families 1 and 2, by treating carbon fibres (Toho Tenax Europe company, IMS reference 5001 24k) by sizing compositions according to the invention and then impregnating the carbon fibres thus treated with a bisphenol A epoxy diacrylate monomer resin (UCB Chemicals company, reference EB600) and then applying radical polymerization to this resin under an electron beam.

The carbon fibres used are ex-PAN fibres with an intermediate modulus, not sized but on which an electrical surface oxidation has been carried out during their fabrication.

In the case of composites family 1, the carbon fibres are treated with sizing compositions that contain Poly Bd™ 605E prepolymer made by the Sartomer company as the epoxy polybutadiene prepolymer, mercaptosuccinic acid as the cross-linking agent and 2-(dimethylamino)ethyl methacrylate as the catalyst, the mixture being in solution with a mass content of 1 to 2% in ethyl and methyl ether. Three types of sizing compositions that differ only by the mass proportions of their constituents are used, namely:

composition A1: 79% of epoxy polybutadiene prepolymer; 20% of cross-linking agent and 1% of catalyst;
composition B1: 71.7% of epoxy polybutadiene prepolymer; 26.9% of cross-linking agent and 1.4% of catalyst;
composition C1: 65.5% of epoxy polybutadiene prepolymer; 32.8% of cross-linking agent and 1.7% of catalyst.

In the case of composite 2, the carbon fibres are treated with sizing compositions that have the same constituents as those indicated above except for the cross-linking agent that is pentaerythritol tetrakis(3-mercaptopropionate). In this case also, three types of sizing compositions that differ only by the mass proportions of their constituents are used, namely:

composition A2: 70.7% of epoxy polybutadiene prepolymer; 28.8% of cross-linking agent and 0.5% of catalyst;
composition B2: 61.7% of epoxy polybutadiene prepolymer; 37.7% of cross-linking agent and 0.6% of catalyst;
composition C2: 54.7% of epoxy polybutadiene prepolymer; 44.6% of cross-linking agent and 0.7% of catalyst.

In all cases, sizing compositions are applied on the carbon fibres using an impregnation chain type device. The carbon fibre meshes are thus unwound and brought to an impregnation stand by means of a pulley system. The stand contains an impregnation tank on which is placed an ink roller immersed in one of the sizing compositions. After impregnation by this composition, the carbon fibres are rewound around a blank roller. The mass content of the sizing composition deposited on the surface of each carbon fibre is 0.8±0.3%.

A heat treatment is then carried out on the carbon fibres (100° C. for 1 hour) to induce polymerization/cross-linking of the epoxy polybutadiene prepolymer and thus the formation of an elastomer film on their surface.

They are then impregnated with bisphenol A epoxy diacrylate monomer resin using the same impregnation device as that used previously to apply sizing compositions. The mass impregnation ratio of resin in the carbon fibres is 39±3%.

Composites are prepared from wound plies of fibres thus impregnated and are assembled such that these fibres are all oriented along the same direction (single-directional plate). The plies are assembled in a cycle including layup, compaction and assembly steps of the plies. Compaction is done using a vacuum bag to eliminate pores due to layup as much as possible. The compaction cycle is done following an 80° C. heat treatment for 2 hours. The boards thus obtained are left in "vacuum bags" to polymerize the resin under an electron beam. This polymerization is made by means of a Circe™ II type of high energy electron accelerator (10 MeV). The total applied dose is 100 kGy in 2 passes at 50 kGy.

In each family of composites, a part of the composites is subjected to a so-called post-baking treatment that consists of a heat treatment at 160° C. for 1 hour.

The reference composite materials are prepared in parallel proceeding in the same manner as described above but using carbon fibres that have not previously been treated by a sizing composition according to the invention.

Each of the composites in families 1 and 2 and the reference family is subject to 3-point bending tests in the transverse direction according to standard NF EN 2746, using an Instron 5566A test machine equipped with a 10 kN force sensor.

The results of these tests are given in table I below.

TABLE I

| Composites | | Sigma 2 in transverse bending (MPa) |
|---|---|---|
| Reference composites | | 20-26 |
| Family 1 composites | Without post-baking | 39-43 |
| | With post-baking | 49-60 |
| Family 2 composites | Without post-baking | 46-54 |
| | With post-baking | 51-64 |

This table shows that composite materials containing carbon fibres treated by a sizing composition according to the invention have a significantly better transverse bending strength than a composite material containing untreated fibres, particularly when a post-baking treatment has been applied to these composite materials.

Example 3

Preparation of a Sizing Composition According to the Invention in the Form of an Emulsion with an Organic Internal Phase and an Aqueous External Phase A sizing composition according to the invention is obtained in the form of an emulsion with an organic internal phase and an aqueous external phase, proceeding as follows A solution containing 1 g of Poly Bd™ 605E prepolymer made by the Sartomer company in 10 mL of ethyl acetate is prepared.

At the same time, a solution of 1 g pentaerythritol tetrakis(3-mercapto-propionate) in 3 mL of ethyl acetate and 5% molar of 2(dimethylamino)ethyl methacrylate, as a percent of the number of moles of pentaerythritol tetrakis(3-mercaptopropionate), is prepared.

The two real solutions thus obtained are mixed and the resulting mixture is progressively added to 40 mL of a solution containing 2% by mass of sodium dodecylsulphate in water.

The entire mixture is then made into an emulsion using a rotor-stator type of homogeniser used at a rotation speed of 24 000 rpm for two minutes.

The emulsion thus obtained is analysed by "Dynamic Light Scattering" (DLS) to measure the size of droplets present in this emulsion.

Figure 3:
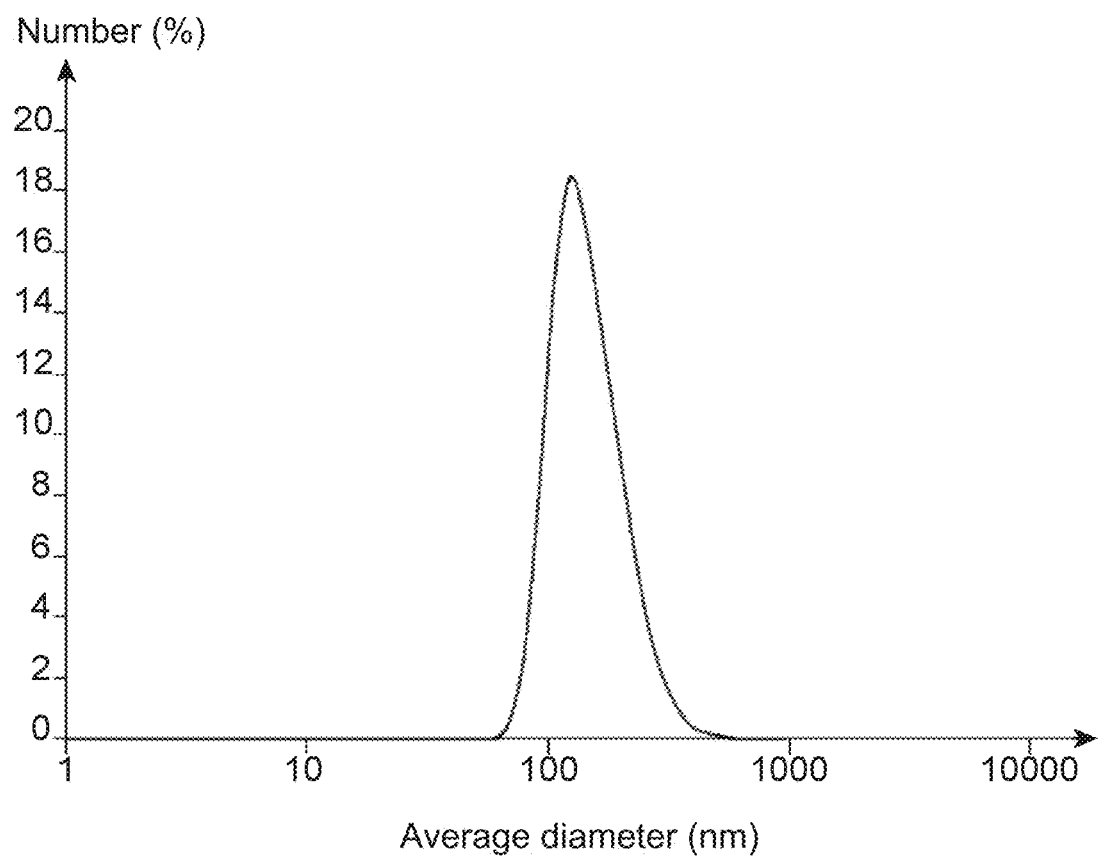
FIG. 3 illustrates the distribution of the number of droplets of a sizing composition according to the invention in the form of an emulsion with an aqueous external phase as a function of the average diameter, expressed in nm, as determined from three measurements made by dynamic diffusion of light.

The results of this analysis are illustrated on FIG. 3 that shows the distribution of the number of droplets in the emulsion as a function of the average diameter (or equivalent diameter), expressed in nm, as determined from three DLS measurements.

They show that the average diameter of the largest population of droplets is 122.4 nm. Therefore the average diameter of the largest population of droplets is within the required 50 to 150 nm range. The average diameter of the smallest droplets is 68 nm representing less than 1% of the droplets present in the emulsion. Similarly, the average diameter of not more than 1% of the droplets is more than 550 nm.

Therefore the emulsion is assumed to be composed mostly of droplets capable of providing a stable emulsion and is entirely composed of droplets capable of leading to the formation of a homogeneous elastomer filter over the entire surface of the substrate.

Stability of the emulsion is confirmed by an accelerated aging test that consists of centrifuging for 5 minutes at a rotation speed of 1000 rpm, after which no demulsification is observed.

REFERENCES

[1] Japanese Patent Application No. 3-076869
[2] European Patent Application No. 1 484 435
[3] European Patent Application No. 0 640 702
[4] Japanese Patent No. 2002-327374
[5] European Patent Application No. 1 924 727
[6] European Patent Application No. 2 099 849

The invention claimed is:

1. A method of sizing a surface of reinforcing fibres with an elastomer film bearing thiol functions, comprising:
   soaking the fibres in a sizing composition comprising a polybutadiene prepolymer that can form an elastomer film on the surface of the fibres by polymerization and crosslinking, the polybutadiene prepolymer comprising at least two epoxy functions; a cross-linking agent for cross-linking the polybutadiene prepolymer, the cross-linking agent comprising at least three reactive functions, at least one of the three reactive functions being a thiol function; and a catalyst for catalyzing the cross-linking of the polybutadiene prepolymer by the cross-linking agent, the catalyst comprising at least one tertiary amine function;
   removing the fibres from the sizing composition; and
   heat treating the fibres so removed from the sizing composition for polymerizing and cross-linking the polybutadiene prepolymer, whereby the elastomer film bearing thiol functions forms on the surface of the fibres.

2. The method of claim 1, wherein the fibres are carbon fibres.

3. The method of claim 1, wherein the polybutadiene prepolymer comprises at least two repetitive units chosen from the units of formulas (I) and (II):

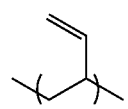

and at least two repetitive units of formula (III):

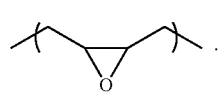

4. The method of claim 1, wherein the cross-linking agent is a compound comprising two carboxylic acid functions and one thiol function, or three thiol functions.

5. The method of claim 1, wherein the catalyst is 2-(dimethylamino)ethyl methacrylate, 2-(dimethylamino)ethyl acrylate, 2-(diethylamino)ethyl acrylate or 3-(dimethylamino)propyl acrylate.

6. The method of claim 1, wherein the sizing composition comprises in percentages by mass of the total mass of the sizing composition:
   from 45% to 96% of the polybutadiene prepolymer;
   from 2.5% to 55% of the cross-linking agent; and
   from 0.1% to 2.2% of the catalyst.

7. A method of improving an adhesion of reinforcing fibres with respect to an organic matrix forming with the fibres a part made of a composite material, comprising:
   sizing a surface of the fibres with an elastomer film bearing thiol functions comprising:
      soaking the fibres in a sizing composition comprising a polybutadiene prepolymer that can form an elastomer film on the surface of the fibres by polymerization and crosslinking, the polybutadiene prepolymer comprising at least two epoxy functions; a cross-linking agent for cross-linking the polybutadiene prepolymer, the cross-linking agent comprising at least three reactive functions, at least one of the three reactive functions being a thiol function; and a catalyst for catalyzing the cross-linking of the polybutadiene prepolymer by the cross-linking agent, the catalyst comprising at least one tertiary amine function;
      removing the fibres from the sizing composition;
      heat treating the fibres so removed from the sizing composition for polymerizing and cross-linking the polybutadiene prepolymer, whereby the elastomer film bearing thiol functions forms on the surface of the fibres;
   bringing the fibres with the surface so sized into contact with a resin that can be cured by a chain transfer polymerization; and
   curing the resin by the chain transfer polymerization.

8. The method of claim 7, wherein the fibres are carbon fibres.

9. The method of claim 7, wherein the resin is a polyester, an epoxy, an epoxy(meth)acrylate, a urethane (meth)acrylate, a bismaleimide, an elastomer or a silicon.

10. The method of claim 7, wherein the polybutadiene prepolymer comprises at least two repetitive units chosen from the units of formulas (I) and (II):

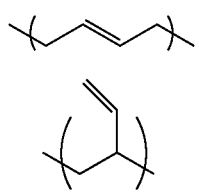
(I)
(II)

and at least two repetitive units of formula (III):

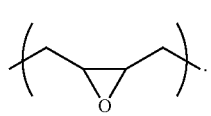
(III)

11. The method of claim 7, wherein the cross-linking agent is a compound comprising two carboxylic acid functions and one thiol function, or three thiol functions.

12. The method of claim 7, wherein the catalyst is 2-(dimethylamino)ethyl methacrylate, 2-(dimethylamino) ethyl acrylate, 2-(diethylamino)ethyl acrylate or 3-(dimethylamino)propyl acrylate.

13. The method of claim 7, wherein the sizing composition comprises in percentages by mass of the total mass of the sizing composition:
from 45% to 96% of the polybutadiene prepolymer;
from 2.5% to 55% of the cross-linking agent; and
from 0.1% to 2.2% of the catalyst.

14. A method of manufacturing a part made of a composite material comprising reinforcing fibres in an organic matrix, comprising:
sizing a surface of the fibres comprising:
soaking the fibres in a sizing composition comprising a polybutadiene prepolymer that can form an elastomer film on the surface of the fibres by polymerization and crosslinking, the polybutadiene prepolymer comprising at least two epoxy functions; a cross-linking agent for cross-linking the polybutadiene prepolymer, the cross-linking agent comprising at least three reactive functions, at least one of the three reactive functions being a thiol function; and a catalyst for catalyzing the cross-linking of the polybutadiene prepolymer by the cross-linking agent, the catalyst comprising at least one tertiary amine function;
removing the fibres from the sizing composition;
heat treating the fibres so removed from the sizing composition for polymerizing and cross-linking the polybutadiene prepolymer, whereby the elastomer film bearing thiol functions forms on the surface of the fibres;
bringing the fibres with the surface so sized into contact with a resin that can be cured by a chain transfer polymerization; and
curing the resin by the chain transfer polymerization.

15. The method of claim 14, wherein the fibres are carbon fibres.

16. The method of claim 14, wherein the resin is a polyester, an epoxy, an epoxy(meth)acrylate, a urethane (meth)acrylate, a bismaleimide, an elastomer or a silicon.

17. The method of claim 14, wherein the polybutadiene prepolymer comprises at least two repetitive units chosen from the units of formulas (I) and (II):

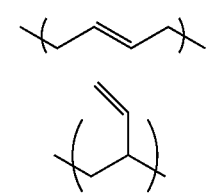
(I)
(II)

and at least two repetitive units of formula (III):

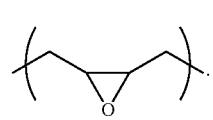
(III)

18. The method of claim 14, wherein the cross-linking agent is a compound comprising two carboxylic acid functions and one thiol function, or three thiol functions.

19. The method of claim 14, wherein the catalyst is 2-(dimethylamino)ethyl methacrylate, 2-(dimethylamino) ethyl acrylate, 2-(diethylamino)ethyl acrylate or 3-(dimethylamino)propyl acrylate.

20. The method of claim 14, wherein the sizing composition comprises in percentages by mass of the total mass of the sizing composition:
from 45% to 96% of the polybutadiene prepolymer;
from 2.5% to 55% of the cross-linking agent; and
from 0.1% to 2.2% of the catalyst.

21. A method of sizing a surface of reinforcing fibres with an elastomer film bearing thiol functions, comprising:
soaking the fibres in a sizing composition comprising a polybutadiene prepolymer that can form an elastomer film on the surface of the fibres by polymerization and crosslinking, the polybutadiene prepolymer comprising at least two epoxy functions; a cross-linking agent for cross-linking the polybutadiene prepolymer, the cross-linking agent comprising at least three reactive functions, at least one of the three reactive functions being a thiol function; and a catalyst for catalyzing the cross-linking of the polybutadiene prepolymer by the cross-linking agent, the catalyst comprising at least one tertiary amine function;
removing the fibres from the sizing composition; and
heat treating the fibres so removed from the sizing composition for polymerizing and cross-linking the polybutadiene prepolymer, whereby the elastomer film bearing thiol functions forms on the surface of the fibres;
wherein the polybutadiene prepolymer comprises at least two repetitive units chosen from the units of formulas (I) and (II):

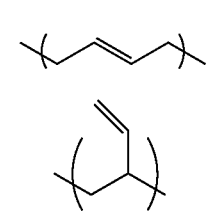
(I)
(II)

and at least two repetitive units of formula (III):
* * * * *